United States Patent [19]

Naito

[11] Patent Number: 5,068,842

[45] Date of Patent: Nov. 26, 1991

[54] CONTROL METHOD OF DISK DRIVE FOR RECORDABLE OPTICAL DISK

[75] Inventor: Ryuuich Naito, Saitama, Japan

[73] Assignee: Pioneer Electronic Corporation, Tokyo, Japan

[21] Appl. No.: 268,301

[22] Filed: Nov. 7, 1988

[30] Foreign Application Priority Data

Nov. 13, 1987 [JP] Japan ..................................... 286765

[51] Int. Cl.$^5$ .......................... G11B 7/00; G11B 27/10
[52] U.S. Cl. .......................................... 369/32; 369/48
[58] Field of Search ..................... 369/32, 48, 49, 54, 369/58, 59; 360/49, 31, 48, 53, 72.1; 364/245.3, 970.1

[56] References Cited

U.S. PATENT DOCUMENTS

| | | | |
|---|---|---|---|
| 4,229,808 | 10/1980 | Hui | 360/48 |
| 4,498,146 | 2/1985 | Martinez | 360/31 |
| 4,545,044 | 10/1985 | Satoh et al. | 369/32 |
| 4,575,827 | 3/1986 | Kulakowski | 365/230.01 |
| 4,775,969 | 10/1988 | Osterlund | 369/59 |
| 4,791,623 | 12/1988 | Deiotte | 369/59 |
| 4,811,124 | 3/1989 | Dujari et al. | 369/59 |
| 4,833,663 | 5/1989 | Satoh et al. | 369/32 |
| 4,903,198 | 2/1990 | Iwasaki | 364/200 |
| 4,953,122 | 8/1990 | Williams | 369/59 |
| 4,958,314 | 9/1990 | Imai et al. | 364/900 |

OTHER PUBLICATIONS 61-20271, 01/29/86, Japanese Abstract.
59-28245, 14/02/84, Japanese Abstract.
58-150111, 06/09/83, Japanese Abstract.
59-94210, 30/05/84, Japanese Abstract.

*Primary Examiner*—Donald McElheny, Jr.
*Attorney, Agent, or Firm*—Sughrue, Mion, Zinn, Macpeak & Seas

[57] ABSTRACT

A control method of a disk drive for a recordable optical disk whose information storage area is divided into plural bands and comprises first sectors for recording user data and third sectors for recording defect management this information represents addresses of the defect first sectors and corresponding second sectors. The control method includes the steps of receiving a command to get access to an indicated address, reading out the latest defect management information in the band including a sector of the indicated address, and storing the latest defect management information on a memory in the disk drive.

3 Claims, 5 Drawing Sheets

| CONTROL TRACK | | TRACK NUMBER | | | NUMBER OF TRACKS | |
|---|---|---|---|---|---|---|
| MAP AREA | # 1 | 1 | ~ | 4 | ( 4 TRACKS ) |
| MAP AREA | # 2 | 5 | ~ | 8 | ( 4 TRACKS ) |
| MAP AREA | #62 | 245 | ~ | 248 | ( 4 TRACKS ) |
| MAP AREA | #63 | 249 | ~ | 252 | ( 4 TRACKS ) |
| USER AREA | # 1 | 253 | ~ | 566 | ( 314 TRACKS ) |
| ALTERNATIVE AREA | # 1 | 567 | ~ | 570 | ( 4 TRACKS ) |
| USER AREA | # 2 | 571 | ~ | 884 | ( 314 TRACKS ) |
| ALTERNATIVE AREA | # 2 | 885 | ~ | 888 | ( 4 TRACKS ) |
| USER AREA | #61 | 19333 | ~ | 19646 | ( 314 TRACKS ) |
| ALTERNATIVE AREA | #61 | 19647 | ~ | 19650 | ( 4 TRACKS ) |
| USER AREA | #62 | 19651 | ~ | 19992 | ( 342 TRACKS ) |
| ALTERNATIVE AREA | #62 | 19993 | ~ | 19996 | ( 4 TRACKS ) |
| ALTERNATIVE AREA | #63 | 19997 | ~ | 20000 | ( 4 TRACKS ) |

CONTROL METHOD OF DISK DRIVE FOR RECORDABLE OPTICAL DISK

BACKGROUND OF THE INVENTION

The present invention relates to a control method of an apparatus for data recording and reproducing for information interchange, more particularly it relates to a control method of a disk drive for an optical recording/ reproducing disk.

Two different types of optical disks for information interchange are well known in the prior art. One is the optical disk in which users can only reproduce prerecorded information and cannot record any information thereon, such as ROM (Read Only Memory) type optical disk. The second is the optical disk in which the users, can not only reproduce but also record information. Hereinafter, the latter is called "recordable" optical disk.

An example of an assembly diagram of a disk drive for a recordable optical disk is shown in FIG. 1.

In FIG. 1, the recordable optical disk is exampled by a Write Once Read Memory (WORM) type optical disk (1). The optical disk 1 comprises recordable disk medium with a large storage capacity, whose storage capacity ranges from several hundred Mega Bytes to several Giga Bytes per disk. In this kind of optical disk, defect are inevitable in the recording area; thus defect management is necessary. For this purpose, the defect management information is also recorded in the assigned area of the optical disk (1). The defect management information designates addresses of defective sectors and alternative sectors which store the information intended for the defective sectors. A loading mechanism (3) of a disk drive (2) sends an optical disk to recording/reproducing apparatus (4) in the disk drive when the optical disk is inserted to the disk drive (2), and also automatically ejects the optical disk from the disk drive (2) when the optical disk is released from the recording-/reproducing apparatus (4). A recording/ reproducing apparatus (4) records and reads information on the optical disk which is set thereto by loading mechanism (3).

A controller (5) comprising a microprocessor controls the recording/reproducing apparatus (4) so as to record information transferred from a host computer (6) on the optical disk and/or reproduce information. The reproduced information is transferred to the host computer (6) from the optical disk in response to a command from the host computer (6) through an interface (7) such as Small Computer System Interface (SCSI). The controller (5) also controls the loading mechanism (3). A Random Access Memory (RAM) (8) is included in the controller (5) to store the defect management information of a loaded optical disk.

In the arrangement as shown in FIG. 1, when an optical disk is inserted to the disk drive (2), the loading mechanism sets it into the recording/reproducing apparatus (4). Then, the controller (5) actuates recording/reproducing apparatus (4) to read out all of the defect management information which have been recorded on the assigned area of the optical disk, and causes the information to be stored in the RAM (8) in the controller (5). Thereafter, when the controller (5) receives a command from the host computer, it judges on the basis of the defect management information in the RAM (8) whether an indicated sector is defective, in which case the controller indicates the address of the alterative sector, for the indicated sector, to the recording/ reproducing apparatus (4). When the controller receives a command to record information in a sector on the disk and a recording error occurs in the sector, the same information being recorded in the sector is recorded again on an appropriate a corresponding alternate sector in an alternate area determined by the defect management information in the RAM (8). The controller then updates the defect management information of the RAM (8) to represent the most recently detected defect.

As described above, the conventional control method of the disk drive for an optical disk requires a predetermined procedure comprising the steps of: setting an optical disk to the recording/reproducing apparatus (4), reading out all of the defect management information which were recorded beforehand on the optical disk, and executing commands for indicating read-out and write-in, which are transferred from the host computer (6). In this method, extra time for reading out all of the defect management information is required, which effects start up time between completing the predetermined procedure from loading the optical disk and executing the first command.

The above disadvantage of the conventional method will be described hereinunder in detail.

An example of the conventional defect management method for a Write Once Read Memory type optical disk of 130 mm in diameter is shown in FIG. 2. There are 20,000 tracks to be assigned to the disk, which are numbered as No. 1 to No. 20,000. A track is divided into 32 sectors, and each sector has a memory capacity of 512 bytes.

The user area is a memory area, which constitutes a majority of the memory, for users to record/reproduce data on the disk. An alternative area is a memory area to store data which was originally intended to be recorded in a user area, but was judged as defective by a verify-read user area, operation just after recording the data on the user area. Herein, the defective sector is a sector in which quality of signals reproduced therefrom can not reach a predetermined level due to various errors caused by small defects on the optical disk. A map area is a memory area to store the defect management information, indicating which sectors in the user area correspond to sectors in the alternative area.

Further, a data storage area of the optical disk can be divided into plural bands, for example, 63 bands at maximum. Each band comprises a map area, an alternative area and an user area. However, some bands have no user area as described hereinafter. Four tracks in each band (128 sectors) are assigned to the map area and the alternative area respectively, but the number of tracks assigned to the user area is not fixed. Also, it is not specified as to which type of area is located in each band. These parameters can be arbitrarily determined by the users, or can be automatically assigned by the controller in the disk drive. To store the parameters thus determined, a control track is prepared in a specified area which is different from the track areas corresponding to track No. 1 to 20,000.

FIG. 2 shows an example of a format for band division and track numbering in each area. The data storage area of the optical disk is divided into 63 bands of #1 to #63. In this example, each of the bands of #1 to #62 has a user area, and the band #63 has no user area. Each user within bands of #1 to #61 includes 314 tracks, and band 62 includes 342 tracks to adjust a fraction of tracks.

When data is recorded on a sector in the user area of the band #1 and sector has been judged as a defect sector, at the verify read immediately after recording the data. The same data are recorded again on a sector with the foremost address in the alternative area of the band #1 in which data have not yet been recorded. The alternative sector in the alternative area is verified, and the data is recorded on a second alterative sector, if the first alternative sector is judged defective. As above described, the same data is recorded again and again on a different alternative sector until the judgment of the verify-read becomes "not defect" in an alternative area of band #1. As a result, each defective sector in the user area of the band #1 is assigned a sector in the alternative area of the band #1 in a ratio of one to one. The addresses of each defective sector and corresponding alternate sector constitute one data pair within the defect management information. This data pair is recorded at the foremost sector within the map area of band #1, at which--. data have not yet been recorded. Hereafter, this foremost sector will be referred to as the last sector, which signifies the most recently recorded data pair, but not necessarily the last sector in the map area. The sector at which the defect management information is stored in the map area is verified, of course, and the same process as described above is repeated when the sector is judged defective. For the map area, the same data pair is repeatedly recorded on the subsequent sector, until the judgment of the verify-read becomes "not defective" in the map area of the band #1.

The same process as described above is repeated for the bands from #2 to #62. The band #63 is prepared for shortage of memory in the alternative area and/or the map area in the bands from #1 to #62 due to overflow caused by too many defect sectors therein. Therefore, band 63 has no user area.

Next, the map area will be described in detail. Each sector of the map area, which comprises 512 bytes, is divided into 128 fields each consisting of 4 bytes. Three bytes in each field designates the address of a defective sector in the user area and the remaining one byte designates the address of an alternative sector in the alternative area for which the defective sector is alternated. Accordingly, information in each sector of the map area can represent 128 defect management information data pairs at maximum, the number of which is equal to the number of sectors in the alternative area assigned to one band. As a result, one sector in the map area can store all of the defect management information for the band. In the case of data overflow in each band, the band #63 is prepared to store overflowed data.

For the Write Once Read Memory type optical disk, the recorded cannot be erased to use the same storage area again. Whenever a defective sector occurs in a band, one sector in the map area of the band is used to store the defect management informations for the defective sector. When a defective sector occurs in a band for the first time, defect management information represented with 4 bytes is stored on the first field of the first sector in the map area of the band. For the next occurrence of a defective sector in the same band, the defect management information for the first defective sector is stored again on the first field of the second sector in the map area of the band. Defect management information for the second defective sector is newly stored on the second field of the second sector, because the defect management information recorded on the first sector of the map area cannot be amended.

As is described above, the latest defect management information is stored on the last sector. In other words, the defect management information, representing the currently known list of defective sectors, is stored in the map area sector most recently recorded.--; Only the latest defect management information is required for reading data out of the user area and for writing new data to the user area, because it is not aware that on which sector in the alternative area the new data should be recorded again when a defect sector occurs, and because it is not aware that in what address of a sector the next defect management information should be stored.

Due to these facts, when the optical disk is loaded in the disk drive, the following procedure is required:

first, the information on the control track is read to confirm the tracks at which the map area of each band is located, secondly the last sector which have been already used in all of the map areas in all of the bands are found out to read all of the latest defect management information, and thirdly the latest defect management information for all of the bands are transferred to store in the RAM of the disk drive.

Next, time required for reading out a defect management information will be described hereafter. Assuming a rotational speed of an optical disk is 1,800 r.p.m., it takes 33 msec per revolution. When the map area of each band is mostly used, it cannot be expected to save time by searching area of the next band immediately after reading the latest defect management information stored on the last recorded sector in the current band. In such a case, the whole map area is read one by one with the rotation of a disk. As the total number of tracks assigned to all map area is 252, it takes 8.4 seconds to read the whole map area.

The optical disk system has a great advantage that the optical disk is exchangeable. However, as described above, it takes more than 8 seconds every exchange to read the defect management information, so that the conventional optical disk system has a problem that a time required for reading out all the defect management informations is superfluously added to the time required for loading an optical disk.

SUMMARY OF THE INVENTION

An object of the present invention is to provide a control method of a disk drive for a recordable optical disk, which can shorten the loading time required for loading an optical disk.

This object is achieved by the control method of loading a disk drive for a recordable optical disk whose information storage area is divided into plural bands and comprises first sectors for recording user data, second sectors for alternatively recording the data instead of in defective first sectors, and third sectors for recording defect management informations representing addresses of the defective sectors and the alternative sectors in data pairs, the control method characterized by comprising the steps of: receiving a command to get access to an indicated address, reading out the latest defect management information in the band including a sector of the indicated address, and storing the latest defect management information on a memory in the disk drive.

DESCRIPTION OF THE PREFERRED EMBODIMENTS

Figures 1, 2:
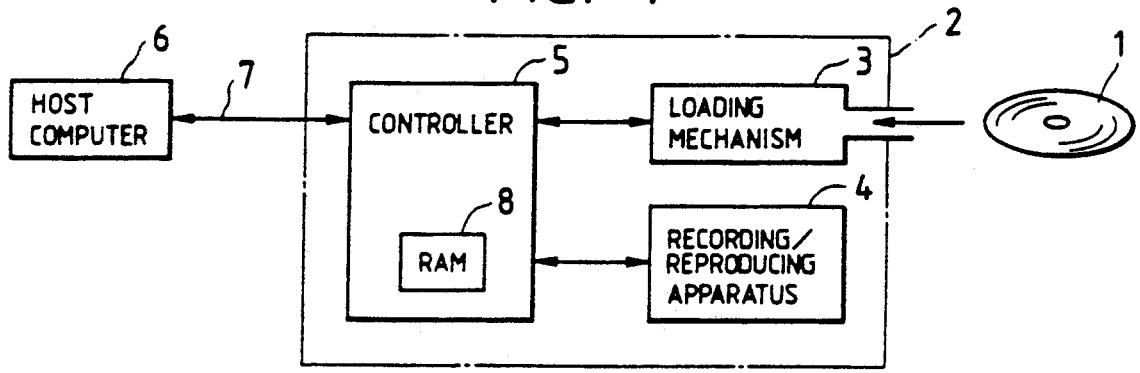
FIG. 1 shows an example of an assembly diagram of a disk drive for a recordable optical disk, to which the control method of the present invention is applied.
FIG. 2, shows an example of a format for band division and area assignment with track numbers.

The control method of the present invention can be provided for a disk drive for a recordable optical disk, which is shown in the FIG. 1. When an optical disk is inserted into the disk drive and is loaded in a recording/ reproducing apparatus (4) by a loading mechanism (3), unlike the conventional method the controller of the disk drive of this invention does not immediately a command to read all of the defect management information for all bands. After the controller receives a command for access to an indicated address, only the latest defect management information in the band to which the indicated address belongs is read out. The latest defect management information thus read out is stored in the RAM (8) of the disk drive, which has a capacity for 63 bands, that is, 32,256 bytes (63×512 bytes).

Figure 3:
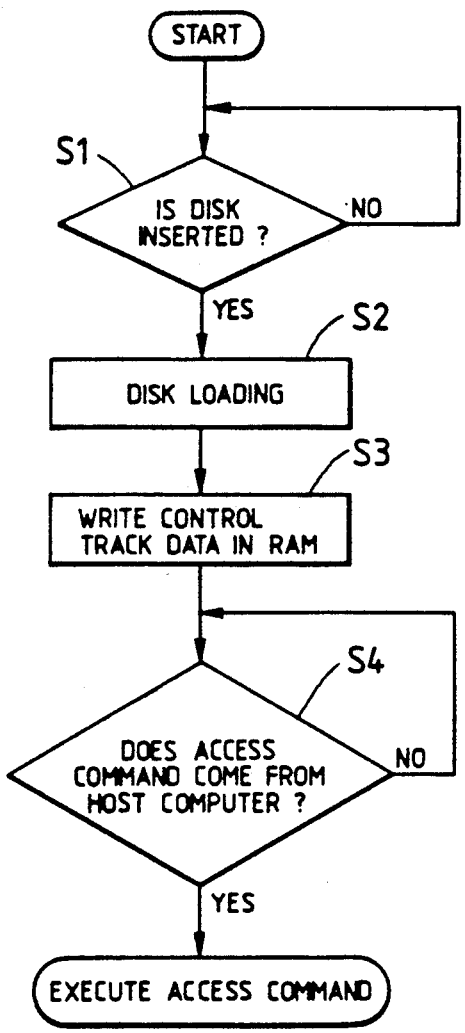
FIG. 3, and FIG. 4 show flowcharts for an embodiment of the operating process of the control method of the present invention.
Figure 4:
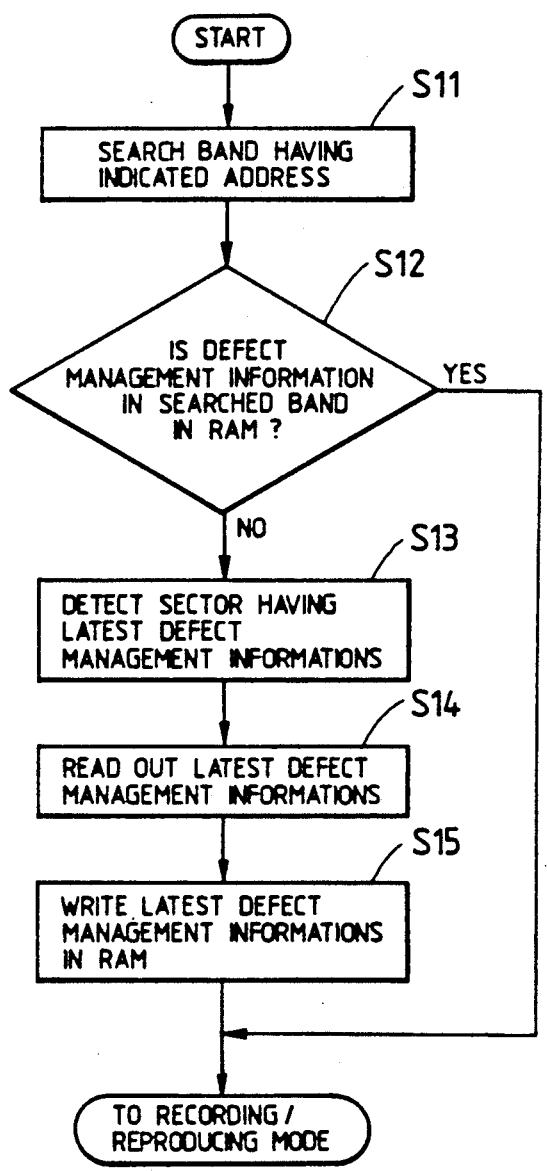

Hereinafter, an operating process of the micro processor in the controller (5) according to the present invention will be described with the flow charts as shown in FIG. 3 and FIG. 4.

FIG. 3 shows a flowchart for the operating process from the time when the optical disk (1) is inserted into the disk drive (2), to the time when a command from the host computer (6) can be accepted by the controller of the disk drive. When the optical disk is inserted into the disk drive (2), a microprocessor of the disk drive detects insertion of the optical disk by a detection means (not shown) in step S1. Then, it drives the loading mechanism to set the inserted optical disk (1) to the recording-/reproducing apparatus (4) in step S2. At the next step, it controls the recording/reproducing apparatus (4) to read out informations stored on the control tracks of the inserted optical disk and store them in RAM the (8) of the disk drive in step S3. By these steps, the information on the relation between respective areas and track numbers for all bands is stored in the RAM. Hence, the processor gets into step S4 in which it is awaiting a command from the host computer (6).

Hereinafter, an operating process of the microprocessor in the controller (5) after an access command is transferred from the host computer (6) described with the flowchart as shown in FIG. 4. First, in a step 11 the processor searches the band to which the sector corresponding to the address indicated by the host computer belongs, on the basis of the information which was read out of the control tracks in the step S3. The processor judges whether the defect management information in the band have already been stored in the RAM (8) in a step S12. Immediately after the optical disk is inserted to the disk drive, no defect management information has been stored in the RAM (8). Therefore, the processor controls the reading/ reproducing apparatus (4) to successively read out 128 sectors in the map area of the indicated band. The sector having the most current defect management information is detected in a step S13. Then, the most current defect management information is read out in step S14 and stored in the RAM (8) in step S15. By these steps, the information on the correspondence between each defective sector in the user area and each alternative sector in the alternative area in the indicated band is stored in the RAM (8), whereby the disk drive is prepared for the usual recording/reproducing mode.

Hereinafter, the time required for the operating process from step S13 to step S15 will be described. In the optical disk system, the access time is defined as the sum of a seek time which, is required to reach a track to be searched, and a waiting time for rotation of the disk. The seek time is usually below 100 msec and the mean waiting time for the disk drive system at 1,800 rpm is about 16.7 msec. Further, a time for 4 revolutions of the disk is required to get to the sector having the most recent defect management information in the map area and to read out the defect management information, which is equal to about 133.3 msec. The total time required for the operating process in steps S13 to S15 is about 250 msec. (100 msec. +16.7 msec. +133.3 msec.). The conventional method requires a waiting time above 8 seconds, since all of the defect management information in every bond is read out during a time period between insertion of the optical disk and execution of a command from the host computer (6). However, by the control method of the present invention, a waiting time of 250 msec is required for only the first access to the indicated band. Since the defect management information in the band which has been indicated once is already stored in the RAM (8), the processor can neglect the operating process of the steps of S13 to S15 and immediately moves into the usual recording/ reproducing mode.

Figure 5:
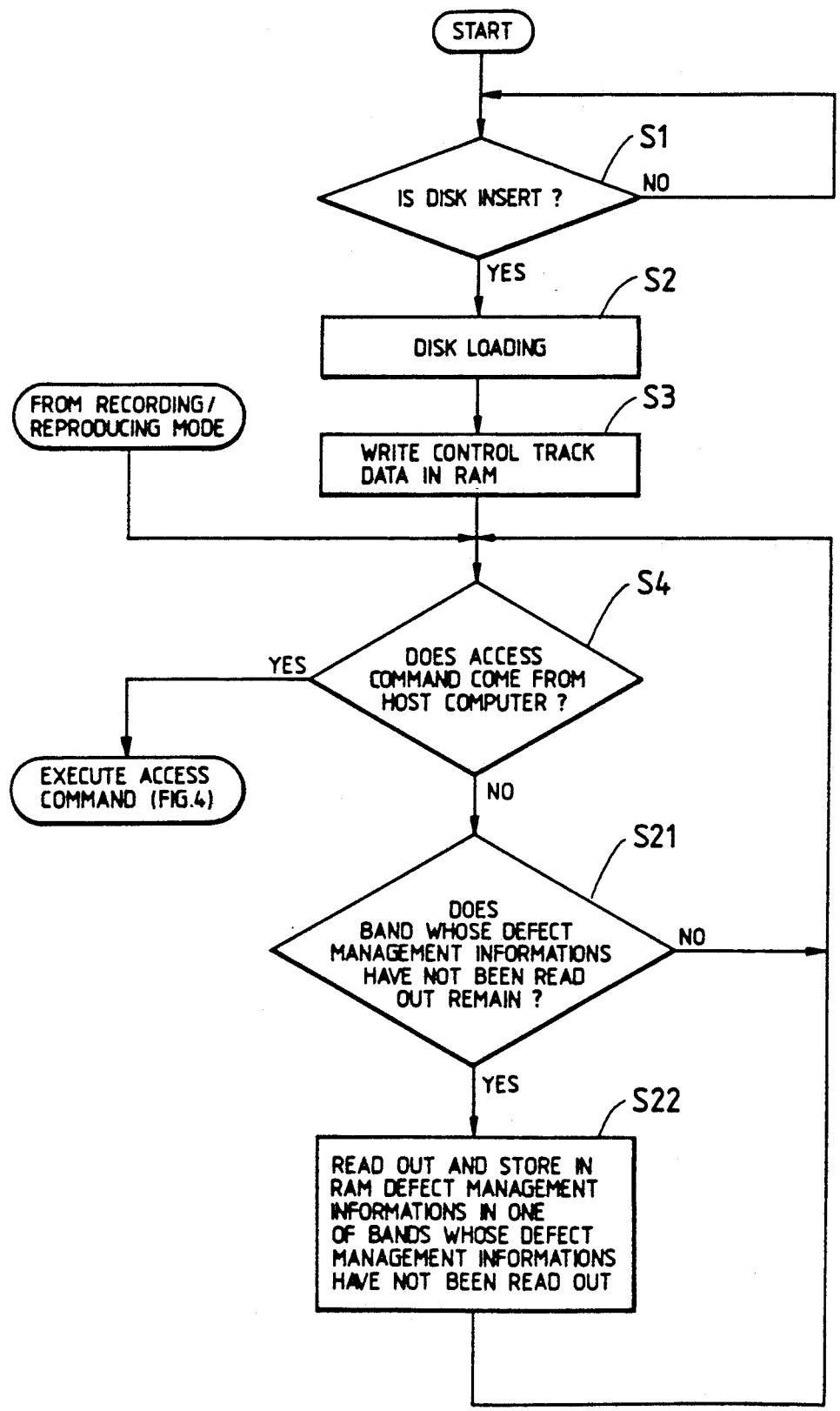
FIG. 5 shows a flowchart for another embodiment of process of the control method of the present invention.

In the embodiment as described above, a time of 250 msec. is excessively required for a command of a first access to a band. To reduce this excessive time, another embodiment of the control method according to the present invention is shown with a flowchart as shown in FIG. 5. In the operation process of FIG. 5, the steps of S1 to S4 are the same as those as shown in FIG. 3. However, in the embodiment as shown in FIG. 5, the processor judges in step 21 if there remains a band whose defect management information has not yet been stored in the RAM (8), when judging in step S4 that a command for access has not been transferred from the host computer. If it is judged that there remain bands whose defect management information has not yet been read, the processor begins to read out defect management information information in one of the bands whose defect management information has not yet been read out and store it in the RAM (8) in the step S22. The operating process of the step S22 corresponds to those of the steps of S13 to S15 of FIG. 4. When it is judged that a command for access has been received from the host computer in the step S4, the processor is prepared for the usual recording/reproducing mode after all of the operating processes in FIG. 4 have been completed. Even in such a case, the processor brings the disk drive back to the step S4 of FIG. 5 to execute the above operating processes when the usual recording/ reproducing routine in the mode is completed.

Thus, in the control method as shown in the flowchart in FIG. 5, the number of the bands whose defect management information has not yet been read can be reduced for a waiting time when any command for access has not been received.

In the embodiments of the present invention as described above, the RAM (8) for storing the latest defect management information of each band is designed to have a capacity of 32,256 bytes which are assigned to 63 bands. However, the optical disk does not necessarily have 63 bands. Even if it has 63 bands, the host computer would not necessarily get access to all bands. In spite of these facts, use of a RAM having a capacity of about 32 K bytes in the controller of the disk drive may result in high production cost.

Figure 6:
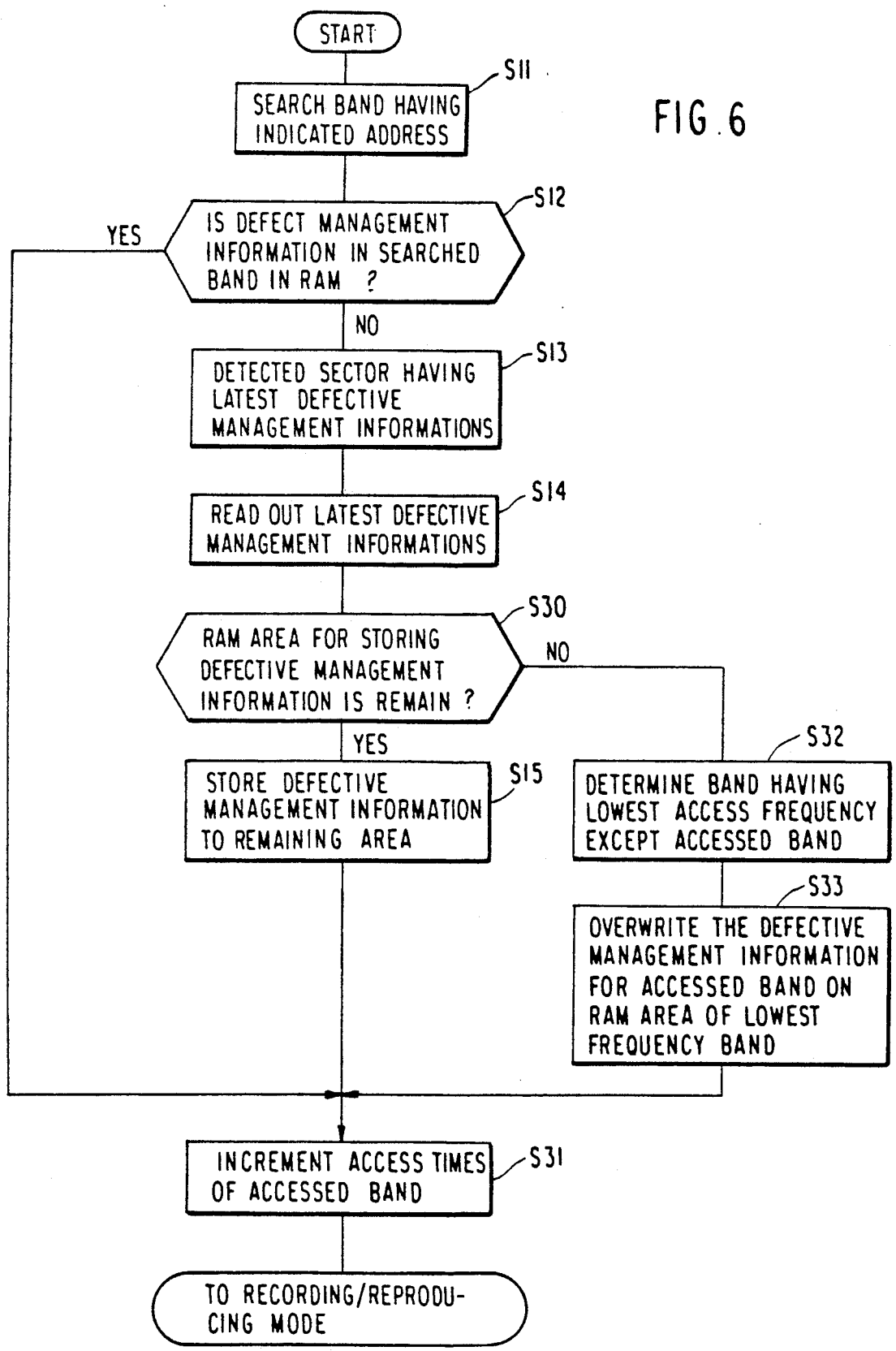
FIG. 6 shows a flow chart of a second embodiment of the control method of the present invention, which reduces memory requirements.
Figure 7:
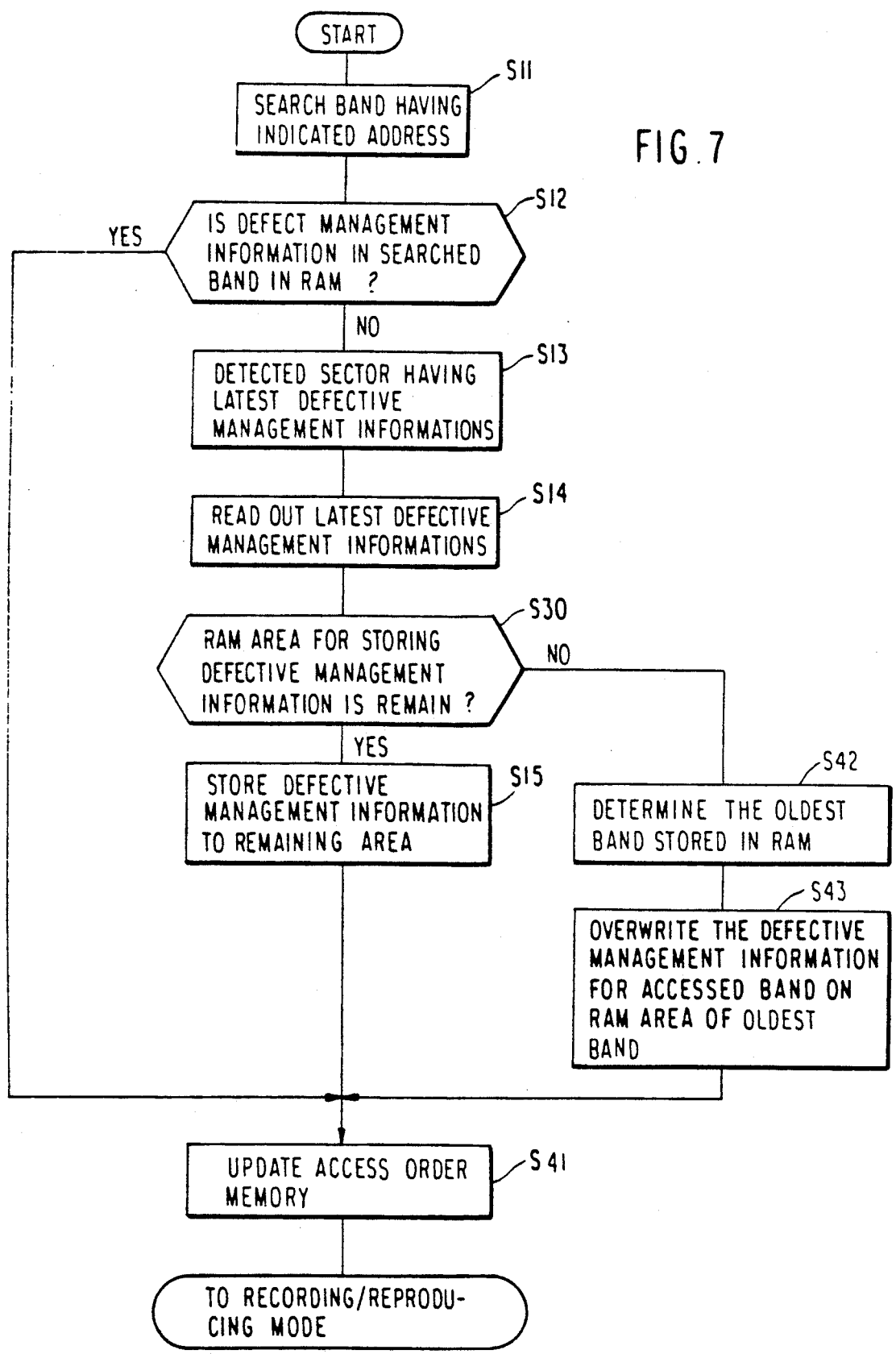
FIG. 7 shows a flowchart of a third embodiment of the control method of the present invention, which reduces memory requirements.

In order to reduce production cost, the capacity of the RAM (8) can be decreased by either manner described below in connection with FIGS. 6 and 7. When the capacity is much smaller, it is of course not capable of storing all of the defect management information for all bands. This determination is made at step S30 (FIGS. 6 and 7). One method includes totalizing an access frequency to each band S31, (FIG. 6), the defect management information for a band having the lowest access frequency can be removed from the RAM (8) S32, and the most recent defect management information for a band which is newly accessed is recorded over the removed defect management information S33. Alternatively, the RAM capacity can be reduced by memorizing the order of access to each band S41 (FIG. 7), determining and removing from the RAM (8) the defect management information of the band to which the access was first made S42, and storing the latest defect management information for a band which is newly indicated to get access on a place on which the removed defect management information is recorded S43.

As was described above, when information is recorded on and read out of a recordable optical disk, the control method of the present invention reads the latest defect management information for the band including a sector designated by an indicated address and stores the defect management information on a memory in the disk drive for the optical disk after receiving a command to get access to the indicated address, so that the loading time for the optical disk is considerably shortened.

What is claimed is:

1. A method for controlling a disk drive for a recordable optical disk whose information storage area is divided into plurality of bands, each band comprising multiple user sectors for recording user data, multiple alternative sectors for recording said user data when said user sectors are defective, and multiple mapping sectors for recording mapping data, said control method comprising the steps of:

receiving a command to access a chosen sector of said multiple user sectors, determining whether a memory location in a memory of said disk drive has stored therein mapping data read from a mapping sector for the band that includes said chosen sector, reading mapping data from the most recently recorded mapping sector for said corresponding band, if said mapping data from said mapping sector has not been previously stored in said memory location, thereby accessing each band's most recently recorded mapping data only as user sectors within said band are chosen, storing the mapping data read from said most recently recorded mapping sector within said disk drive at said memory location, and accessing said chosen sector or an alternate sector defined by said mapping data, depending on whether said mapping data identifies said chosen sector as having no defect or a defect, respectively.

2. A control method according to claim 1, said control method further comprising the steps of:

calculating an access frequency to each band, when a memory capacity of said disk drive is insufficient to store the most recent mapping data for every band of said disk, erasing from said memory, the mapping data for the band, which has the lowest accession frequency, and storing in said memory the most recently recorded mapping data from a band, which is being accessed for the first.

3. A control method according to claim 1, said control method further comprising the steps of:

recording the order in which each band is accessed, in order to retain the oldest accessed band erasing from memory, the mapping data from said oldest accessed band, and storing in said memory the most recently recorded mapping data from a band, which is being accessed for the first.

* * * * *